US007706020B2

(12) United States Patent
Presley et al.

(10) Patent No.: US 7,706,020 B2
(45) Date of Patent: Apr. 27, 2010

(54) EXTENSIBLE SYSTEM FOR COLOR MANAGEMENT

(75) Inventors: Anthony M. Presley, Bellevue, WA (US); Jeffrey R. Bloomfield, Redmond, WA (US); Marilyn Chen, Atherton, CA (US); Michael A. Bourgoin, Lake Forest Park, WA (US); Michael D. Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 1101 days.

(21) Appl. No.: 11/209,834

(22) Filed: Aug. 24, 2005

(65) Prior Publication Data

US 2007/0052985 A1 Mar. 8, 2007

(51) Int. Cl.
- G06F 3/12 (2006.01)
- G03F 3/08 (2006.01)
- G06K 9/00 (2006.01)

(52) U.S. Cl. .................... 358/1.9; 358/518; 382/167
(58) Field of Classification Search ................. None
See application file for complete search history.

(56) References Cited

U.S. PATENT DOCUMENTS

| | | | |
|---|---|---|---|
| 6,603,879 B2 * | 8/2003 | Haikin et al. ............. 382/167 |
| 6,633,668 B1 * | 10/2003 | Newman ................... 382/166 |
| 6,704,442 B2 * | 3/2004 | Haikin et al. ............. 382/162 |
| 6,978,043 B1 * | 12/2005 | Haikin et al. ............. 382/167 |
| 7,106,474 B1 * | 9/2006 | Haikin et al. .............. 358/1.9 |
| 2003/0053682 A1 * | 3/2003 | Haikin et al. ............. 382/162 |
| 2005/0047654 A1 * | 3/2005 | Newman et al. .......... 382/167 |
| 2005/0280853 A1 * | 12/2005 | Newman et al. ........... 358/1.9 |
| 2006/0250623 A1 * | 11/2006 | Newman et al. ........... 358/1.9 |
| 2006/0274342 A1 * | 12/2006 | Haikin et al. .............. 358/1.9 |
| 2007/0081176 A1 * | 4/2007 | Newman et al. ........... 358/1.9 |
| 2007/0234321 A1 * | 10/2007 | Mcdowali .................. 717/141 |

* cited by examiner

*Primary Examiner*—Mark K Zimmerman
*Assistant Examiner*—Mesfin Getaneh
(74) *Attorney, Agent, or Firm*—Shook, Hardy & Bacon, LLP (57) ABSTRACT

A color engine supports extensibility by allowing plug-ins. The color engine transforms an image file associated with a source device for consumption by a destination device. Within the color engine, a device model operates over a device model profile to generate a gamut boundary shell, which describes the range of colors a device is capable of producing. A color appearance model operates over a color appearance model profile to compensate for external viewing conditions. A gamut map model accepts as input gamut boundary shells describing the source device and the destination device, and operates over a gamut map model profile to generate a transform, which is used to transform the image file for consumption by the destination device. The device model profiles and gamut map model profiles may be extended using XML plug-ins, and the device models and gamut map models may be extended using DLL plug-ins.

19 Claims, 6 Drawing Sheets

EXTENSIBLE SYSTEM FOR COLOR MANAGEMENT

STATEMENT REGARDING FEDERALLY SPONSORED RESEARCH OR DEVELOPMENT

None.

BACKGROUND

Devices for displaying or printing graphics, such as Liquid Crystal Displays (LCDs), Cathode Ray Tubes (CRTs), printers, and other devices are typically not able to generate the full range of colors that may be perceived by a user. For example, while a monitor may be able to display the color red, it may not be able to display a particular deep red.

Furthermore, various conditions may alter the appearance of colors to a human viewer. For example, a particular color displayed on a monitor in a darkened room may appear differently than the same color displayed in a sunlit room. As another example, the colors in a photograph may appear differently depending on whether the photograph is printed on glossy or matte paper.

When a device prints or displays an image, a color engine may be used to determine which colors should be output by the device. However, such color engines are typically monolithic, and are typically opaque to users, to hardware manufacturers, and to developers of third-party software. Such color engines are implemented as "black boxes" that cannot be altered or optimized for a particular application or hardware component. For example, a manufacturer of a printer may specify that the printer use the color engine included in a particular operating system, such as the color engine included in the Windows operating system. Alternatively, the manufacturer may specify that another third-party color engine be used, or may elect to design a color engine specifically for the printer. The manufacturer does not have the option to replace selected portions of a color engine, or to specify parameters that allow a color engine to be optimized for the printer.

SUMMARY

Systems and methods for providing color management when image files are transferred from a source device to a destination device are provided. The source device and the destination device may each be associated with a device model profile, which describes the physical characteristics of the device. Data from the device model profile may be used by a device model to generate a "gamut boundary shell." The gamut boundary shell describes the range of colors that a device is capable of generating in a device-independent, viewing condition-independent color appearance space. A color appearance model, which describes the way colors appear to the human eye, may be used to compensate for external conditions, such as variations in ambient lighting.

A gamut-map model is used to generate a transform algorithm, based on the gamut boundary shell of the source device, the gamut boundary shell of the destination device, and data stored in a gamut map model profile. The transform algorithm may be used to convert content from the gamut boundary shell of the source device to the gamut boundary shell of the destination device. Additional processing may be used to perform the end-to-end transformation of an image file for consumption on the destination device from a source device, based on the transform algorithm.

The device model profiles, device models, gamut map model profiles, and gamut map models may all be extensible. Thus, hardware manufacturers and other third parties may choose to extend or replace some or all of these profiles and models by creating "plug-in" software modules. In one implementation, the color device model profiles and gamut map model profiles are implemented in an extensible metalanguage, such as Extensible Markup Language (XML), and the color device models and gamut map models are implemented as Dynamic Link Libraries (DLLs).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawings figures, wherein.

DETAILED DESCRIPTION

In one implementation, the invention relates to a system and method for extensible color management. A color engine accepts plug-in software modules, which may include, for example, device models, gamut map models, device model profiles, and gamut map model profiles. Each device model profile may model a physical output device such as a printer or monitor, and may specify, for example, the range of colors that the device can output in various conditions. Furthermore, each device model profile may optionally point to a plug-in device model which is provided separately from the baseline device models that ship preinstalled on the operating system. This plug-in device model may operate over the data contained in the device model profile.

Because hardware manufacturers and other third parties have the opportunity to extend or replace the device model profile and the device model using plug-ins, the flexibility of the color engine is increased. Furthermore, because the device model may be a sophisticated plug-in, only one device model may be provided for each device, eliminating the large number of device models that may exist in prior art systems.

The color engine may include a color appearance model, which is modeled after the human visual cortex and describes the way humans perceive color in various conditions. The color appearance model may operate over data contained in a color appearance model profile to compensate for viewing conditions.

The color device model and the color appearance model may be used to generate a gamut boundary shell, which describes the range of colors that a device can produce. In one implementation, the gamut boundary shell is described as a triangular mesh.

When an image is transferred from a source device to a destination device, two gamut boundary shells may be created: a source gamut boundary shell describing the range of colors that the source device can produce, and a destination gamut boundary shell describing the range of colors that the destination device can produce. The source gamut boundary shell and the destination gamut boundary shell may be fed into a gamut map model. The gamut map model may operate over data contained in a gamut map model profile to generate a gamut map based on the source gamut boundary shell and the destination gamut boundary shell. In one implementation, the gamut map model profile(s) contain a number of gamut maps, and the gamut map model selects the appropriate gamut map based on the source gamut boundary shell and the destination gamut boundary shell.

Because hardware manufacturers and other third parties have the opportunity to extend or replace the gamut map model profile and the gamut map model using plug-ins, the flexibility of the color engine is increased.

The gamut map may specify the relationship between the source gamut boundary shell and the destination gamut boundary shell, and may therefore be used to generate a transform that specifies how each color in the source gamut boundary shell should be mapped to a color in the destination gamut boundary shell. The gamut map model, the source device model, the destination device model, the source color appearance model, and the destination color appearance model, may be used to generate such an transform based on the gamut map. Once a transform has been created, the transform may be applied to the image to be consumed by the destination device.

Figure 1:
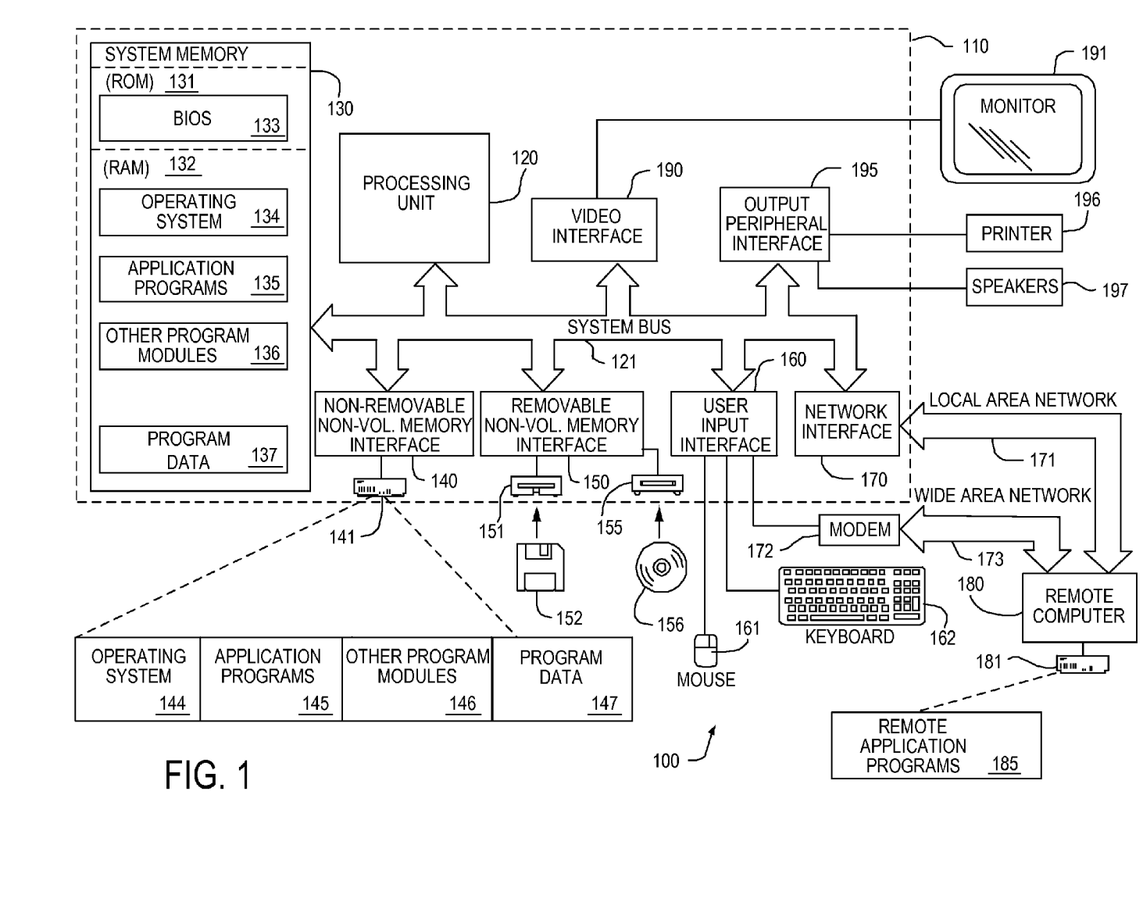
FIG. 1 is block diagram illustrating a computerized environment in which embodiments of the invention may be implemented.

FIG. 1 illustrates an example of a suitable computing system environment 100 on which the system for extensible color management may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 2:
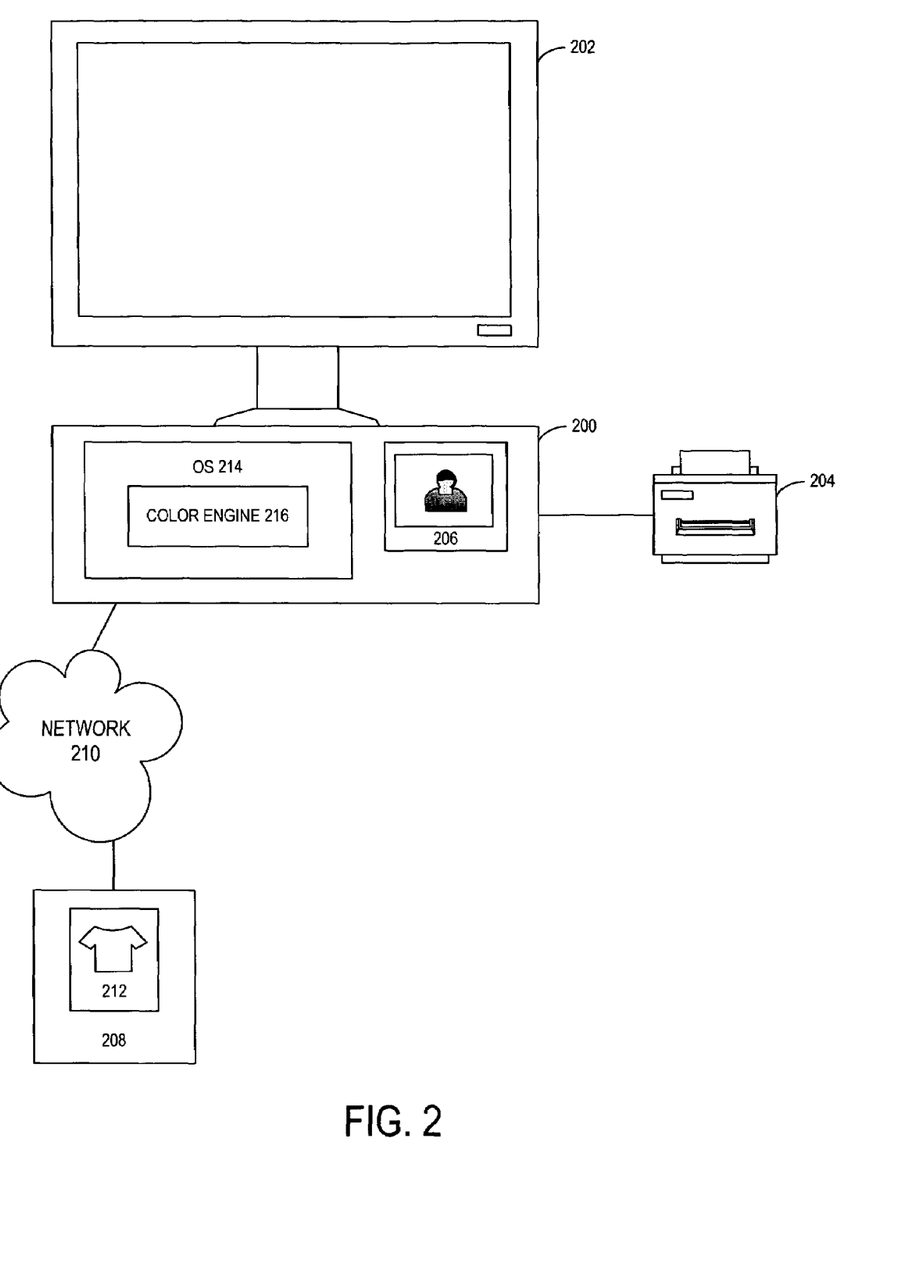
FIG. 2 is a block diagram illustrating an overview of a system in accordance with an embodiment of the present invention.

FIG. 2 is a block diagram illustrating an overview of a system in accordance with an embodiment of the present invention. As shown in FIG. 2, a computer 200 may be connected to one or more output devices 202, 204, such as an LCD, a CRT, a printer, or the like. The computer 200 may store one or more image files 206, such as a photograph files, graphics files, .pdf files, or the like.

Furthermore, the computer 200 may be connected to a remote computer 208 via a network 210, such as the internet. The remote computer 208 may be or include, for example a web server, remote user computer, or other remote computer. The remote computer 208 may store one or more image files 212, such as a photograph files, graphics files, .pdf files, or the like.

The computer 200 may contain an operating system 214, which may in turn contain a color engine 216. In alternate embodiments, the color engine 216 may not be located within the operating system 214, but may instead be located elsewhere on the computer 200, on the remote computer 208, or on the output devices 202, 204.

The color engine 216 may receive be used to generate a transform. The transform may then be applied to an image file originating from or associated with a source device. Once the transform has been applied to the image file, the image file may be sent to a destination device for consumption. The transform may be performed to standardize the appearance of colors for various devices and conditions. The generation of the transform will be discussed in further detail with reference to FIG. 3.

Figure 3:
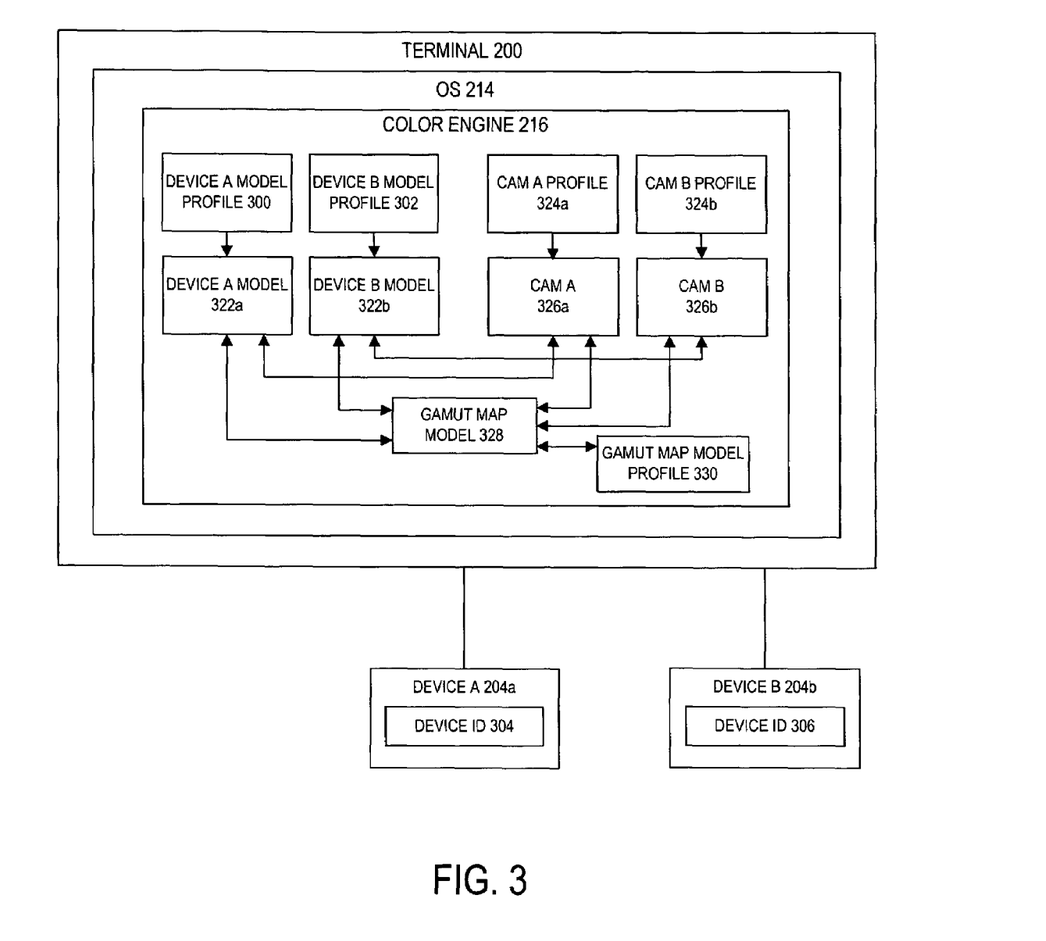
FIG. 3 is a block diagram illustrating an overview of a system in accordance with an embodiment of the present invention.

FIG. 3 is a block diagram illustrating an overview of a system in accordance with an embodiment of the present invention. As shown in FIG. 3, a computer 200 may be in communication with devices 204a, 204b. The computer 200 may include an operating system 214 and a color engine 216. The devices 204a, 204b may be a source device and a destination device for an image file, respectively. For example, if a user of a camera sends a photo to a remote user, who displays the photo on a monitor, the camera may be considered the source device and the monitor may be considered the destination device. As another example, if a user creates a drawing using a paint program and viewing the display on a monitor, and then prints the drawing, the monitor may be considered the source device and the printer may be considered the destination device. Other examples and other source and destination devices are possible.

Each of the devices 204a, 204b may be associated with a device model profile 300, 302. The device model profile may contain data describing the properties of the device. In one implementation, the device model profiles 300, 302 may be implemented as plug-ins that are stored on the computer 200. Alternatively or in addition, default or "base-line" device model profiles may be provided with the operating system 214. The device model profiles 300, 302 may be written in an extensible meta-language, such as Extensible Mark-up Language (XML). In one implementation, the devices 204a, 204b may contain device identifiers 304, 306 that allow the color engine 216 to identify the device, for example, by make and model, and that further allow the color engine 216 to obtain and/or select the appropriate device model profiles 300, 302 for each device 204a, 204b.

In another embodiment, one or more of the available device model profiles can correspond to an idealized or theoretical device. In such an embodiment, one or more of the device model profiles can represent a virtual device, such as an sRGB device or an scRGB device. Even though a virtual device profile does not correspond to an actual device, it can serve as a default or standardized device profile. A virtual device profile can be used as either a source device profile or a destination device profile.

Base-line device model profiles 300, 302 may be provided with the operating system 214. If a hardware manufacturer or other third party wishes to replace or extend the base-line device model profiles, plug-in device model profiles 300, 302 may be created, which may extend or replace the base-line device models. The plug-in device model profiles 300, 302 may be transparent and extensible, or may be opaque, depending on the needs of the hardware manufacturer. In some implementations, hardware manufacturers may choose to encrypt the device model profiles 300, 302. In some implementations, developers may be able to extend the device model profiles 300, 302 in a manner that can be documented independent of the device model profile author.

Each of the device models 322a, 322b, may be executable code, implemented, for example, as a DLL. Similarly to the device model profiles 300, 302, base-line device models 322a, 322b may be provided with the operating system 214. If a hardware manufacturer or other third party wishes to replace or extend the base-line device models, plug-in device models 322a, 322b may be created, which may extend or replace the base-line device models. The plug-in device models 322a, 322b may be transparent and extensible, or may be opaque, depending on the needs of the hardware manufacturer. In some implementations, hardware manufacturers may choose to encrypt the device models 322a, 322b. In some implementations, developers may be able to extend the device models 322a, 322b in a manner that can be documented independent of the device model profile author. Details of the operation of the device models 322a, 322b will be described further below with reference to FIG. 4.

In the event that a device model profile 300, 302 does not contain a reference to a device model plug-in, a base-line device model may be used.

While many prior art systems required a plurality of device models for each device, implementations of the system shown in FIG. 3 may employ only one device model for each device. For example, a printer may not need to have a device model for each combination of paper type, rendering, and printer settings. Instead, a single device model may be used in conjunction with data contained in a device model profile. Device models that are well-suited to extensible color management are described, for example, in *Billmeyer and Saltzman's Color Technology*, written by Roy Berns, and published by John Wiley & Sons.

Each of the devices 204a, 204b may further be associated with a color appearance model (CAM) profile 324a, 324b. Each CAM profile 324a, 324b may contain data describing the color behavior of a device in various viewing conditions. The CAM profiles 324a, 324b may be provided with the operating system 214. The CAM profiles 324a, 324b may be written in an extensible meta-language, such as Extensible Mark-up Language (XML). In one implementation, the devices 204a, 204b may contain device identifiers 304, 306 that allow the color engine 216 to identify the device, for example, by make and model, and that further allow the color engine 216 to obtain and/or select the appropriate CAM profile 324a, 324b for each device 204a, 204b.

Each CAM profile 324a, 324b may be associated with a CAM 326a, 326b. Each CAM 326a, 326b may be executable code implemented, for example, as a DLL. The CAMs 326a, 326b may operate over the data contained in the CAM profiles 324a, 324b to compensate for external viewing conditions.

Because the CAM profiles 324a, 324b and the CAMs 326a, 326b are based on the human visual system, they may be implemented as non-extensible portions of the operating system 214.

The device models 322a, 322b may work in conjunction with the CAMs 326a, 326b to generate a source gamut boundary shell, describing the color capabilities of the source device 204a, and a destination gamut boundary shell, describing the color capabilities of the destination device 204b. In creating these gamut boundary shells, the device models 322a, 322b may operate over data contained in the device model profile 300, 302. Alternatively, the data operated on by device models 322a, 322b can be at least partially provided by an application, or the data can be provided directly from a user interface. CAMs 326a, 326b may operate over the data contained in the CAM profiles 324a, 324b. The gamut boundary shells may be described as triangular meshes in a Commission Internationale de I'Eclairage (CIE) XYZ space The CIE XYZ space will be described further below.

The color engine 216 also includes a gamut map model 328. The gamut map model 328 accepts as inputs the source gamut boundary shell and the destination gamut boundary shell. Using these gamut boundary shells, the gamut map model operates over data contained in a gamut map profile 330 to generate a transform. The transform contains algorithms describing the method to transform colors within the source gamut boundary shell to colors within the destination gamut boundary shell. The gamut map model may work in conjunction with the device models 322a, 322b and the CAMs 326a, 326b to generate the transform.

In one implementation, a plurality of gamut map model profiles are present, each describing various transform algorithms. The gamut map model may select the appropriate gamut map model profile based on the gamut boundary shells.

Base-line gamut map model profiles 330 and base-line gamut map models 328 may be provided with the operating system 214. If a hardware manufacturer or other third party wishes to replace or extend the base-line gamut map model profiles 330 and/or gamut map models 328, plug-in gamut map model profiles 330 and/or gamut map models 328 may be created, which may extend or replace the base-line portions. The plug-in gamut map model profiles 330 and gamut map models 328 may be transparent and extensible, or may be opaque, depending on the needs of the hardware manufacturer. In some implementations, hardware manufacturers may choose to encrypt the plug-in gamut map model profiles 330 and gamut map models 328. In some implementations, developers may be able to extend the plug-in gamut map model profiles 330 and gamut map models 328 in a manner that can be documented independent of the device model profile author.

Furthermore, the device models 322a, 322b, the CAMs 326a, 326b, and the gamut-map model(s) 328 may be configured to share information directly with each other. This may allow transfer of proprietary or encrypted information. For example, a single hardware manufacturer may create one or more plug-in device models 322a, 322b and plug-in gamut-map models 328 that transfer encrypted information between them.

Figure 4:
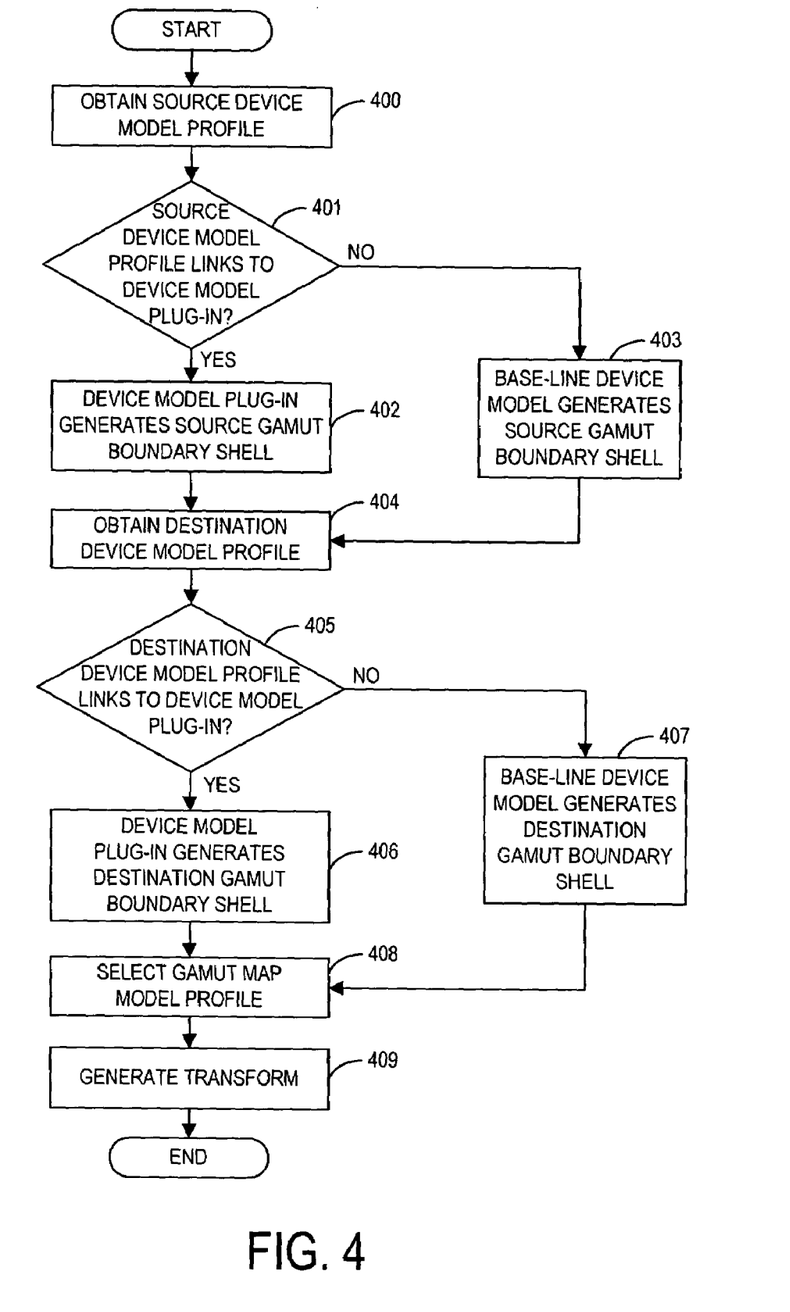
FIG. 4 is a flow chart illustrating a method for generating an image output, in accordance with an embodiment of the present invention.

FIG. 4 is a flowchart illustrating a method for displaying an image file. The image file may be associated with a source device and a destination device. For example, if a user of a camera sends a photo to a remote user, who displays the photo on a monitor, the camera may be considered the source device and the monitor may be considered the destination device. As another example, if a user creates a drawing using a paint program and viewing the display on a monitor, and then prints the drawing, the monitor may be considered the source device and the printer may be considered the destination device. Other examples and other source and destination devices are possible.

The method illustrated in FIG. 4 provides for color consistency when image files are transferred from a source device to a destination device. The method may begin in step 400, wherein a source device model profile may be obtained. The source device model profile contains information which describes the physical characteristics of the source device. The source device model profile may be implemented, for example, as a plug-in located on a computer and written in an extensible meta-language such as XML. The source device model profile obtained may be a base-line source device model, or may be a plug-in source device model profile.

The source device model profile may optionally contain a reference to a device model plug-in. The device model may be, for example, executable code that operates over the data in the source device model profile to generate a source gamut boundary shell. If the source device model profile contains a reference to a device model plug-in, in step 402, the device model plug-in may generate a source gamut boundary shell based on data in source device model profile. The source gamut boundary shell describes the range of colors that the source device can produce. For example, if the source device is a monitor, input parameters to the device model plug-in may include monitor settings, and the source gamut boundary shell will describe the colors that the monitor can produce given the particular monitor settings. If the source device is a printer, input parameters to the device model plug-in may include paper type and rendering program, and the source gamut boundary shell will describe the colors that the printer can produce given the particular paper type and rendering program. In one implementation, a CAM may also be used to generate the source gamut. In this case, external parameters, such as ambient lighting conditions, will be used to determine the colors that can be generated as perceived by a human viewer. The CAM may be used in conjunction with a CAM profile to generate the source gamut boundary shell.

The source gamut boundary shell may be represented, for example, as a triangular mesh in a Commission Internationale de l'Eclairage (CIE) XYZ space. CIE XYZ spaces are based on color representations in the human visual cortex, and thus describe colors in a way that is consistent to the human viewer and is independent of any device or viewing conditions. One example of a CIE XYZ map is a map in the polar coordinate system of hue, chroma, and brightness. Another example of a CIE XYZ map is a map in the Euclidean coordinate system of lightness, blueness/yellowness, and redness/greenness. A triangular mesh contained in the CIE XYZ spaces provides a simple and convenient means of representing the volume of colors included in the source gamut boundary shell.

If the source device model profile does not contain a reference to a device model plug-in, a base-line device model, may generate the source gamut boundary shell 403. The base-line device model may generate the source gamut 403 in a similar manner to the processing plug-in.

The method may continue in step 404, wherein a destination device model profile may be obtained. Similarly to the source device model profile, the destination device model profile contains information which describes the physical characteristics of the destination device. The destination device model profile may be implemented, for example, as a plug-in located on a computer and written in an extensible meta-language such as XML. The source device model profile obtained may be a base-line source device model, or may be a plug-in source device model profile.

The destination device model profile may optionally contain a reference to a device model plug-in. The device model plug-in may be, for example, executable code that operates over the data in the destination device model profile to generate a destination gamut boundary shell. If the destination device model profile contains a reference to a device model plug-in, in step 406, the device model plug-in may generate a destination gamut boundary shell based on the data in destination device model profile. The destination gamut boundary shell describes the range of colors that the destination device can produce. For example, if the destination device is a monitor, input parameters to the device model plug-in may include monitor settings, and the destination gamut boundary shell will describe the colors that the monitor can produce given the particular monitor settings. If the destination device is a printer, input parameters to the device model plug-in may include paper type and rendering program, and the destination gamut boundary shell will describe the colors that the printer can produce given the particular paper type and rendering program. In one implementation, a CAM may also be used to generate the destination gamut boundary shell, in conjunction with a CAM profile. In this case, external parameters, such as ambient lighting conditions, will be used to determine the colors that can be generated as perceived by a human viewer.

The destination gamut boundary shell may be represented, for example, as a triangular mesh in a CIE XYZ space. A triangular mesh contained in the CIE XYZ spaces provides a simple and convenient means of representing the volume of colors included in the destination gamut boundary shell.

If the destination device model profile does not contain a reference to a processing plug-in, a base-line device model may generate the destination gamut 407 in a similar manner to the processing plug-in.

The method may continue in step 408, wherein a gamut-map model profile may be selected. A gamut-map model may select an appropriate gamut map model profile based on the source and destination gamut boundary shells. The selected gamut map model profile may describe the relationship between the source gamut boundary shell and the destination boundary shell.

The selected gamut map model and the source and destination gamut boundary shells are used to generate a transform 410. The transform provides algorithms for performing a transformation on an image by mapping each color contained in the source gamut boundary shell to a color contained in the destination gamut boundary shell. Because both the source gamut boundary shell and the destination gamut boundary shell are represented as triangular meshes, the transformation or "morphing" of colors with the source gamut boundary shell to colors within the destination gamut boundary shell can be described, for example, using techniques from the field of computer graphics.

Figure 5:
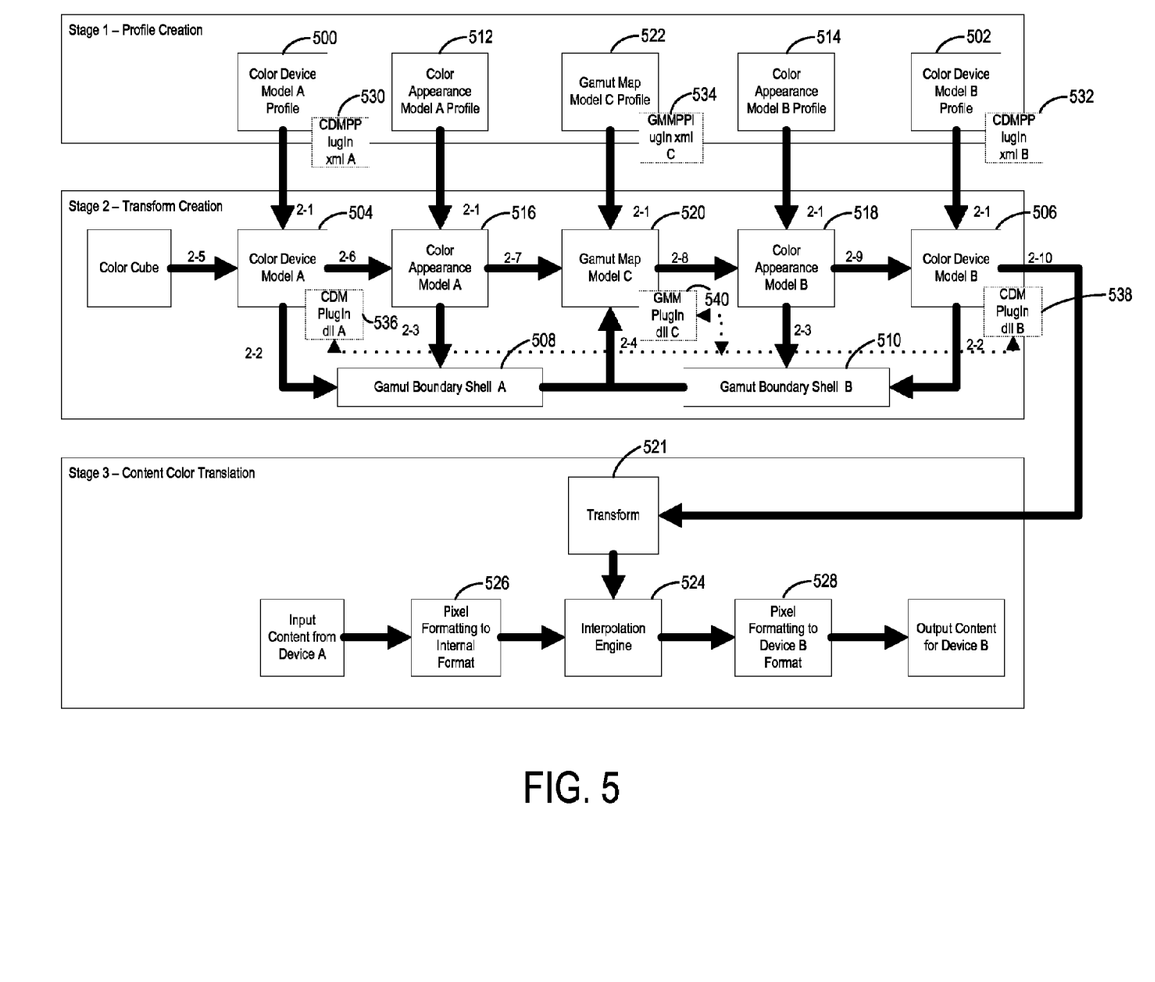
FIG. 5 is a is a flow chart illustrating the flow of data during image processing, in accordance with an embodiment of the present invention.

FIG. 5 is a flow chart illustrating the flow of data. As shown in FIG. 5, data from the device model profiles 500, 502 may be used by device models 504, 506 to generate gamut boundary shells 508, 510. Data from color appearance model profiles 512, 514 may be used by color appearance models 516, 518 to compensate for external conditions, such as variations in ambient lighting.

Gamut-map model 520 is used to generate a transform 521, based on the gamut boundary shells 508, 510, and data stored in gamut map model profile 522. The color device models 504, 506 and the color appearance models 516, 518 may also be used in generating the transform 521. The transform 521 may be used by an interpolation engine 524 to convert content from the gamut boundary shell of the source device to the gamut boundary shell of the destination device. Pixel formatting 526, 528 may be also be used in image conversion.

The device model profiles 500, 502 and the gamut map model profile 522 may be extensible via XML plug-ins 530, 532, 534. The device models 504, 506, and gamut map model 520 may be extensible via DLL plug-ins 536, 538, 540. Thus, hardware manufacturers and other third parties may choose to extend or replace some or all of these profiles and models by creating plug-in software modules.

Figure 6:
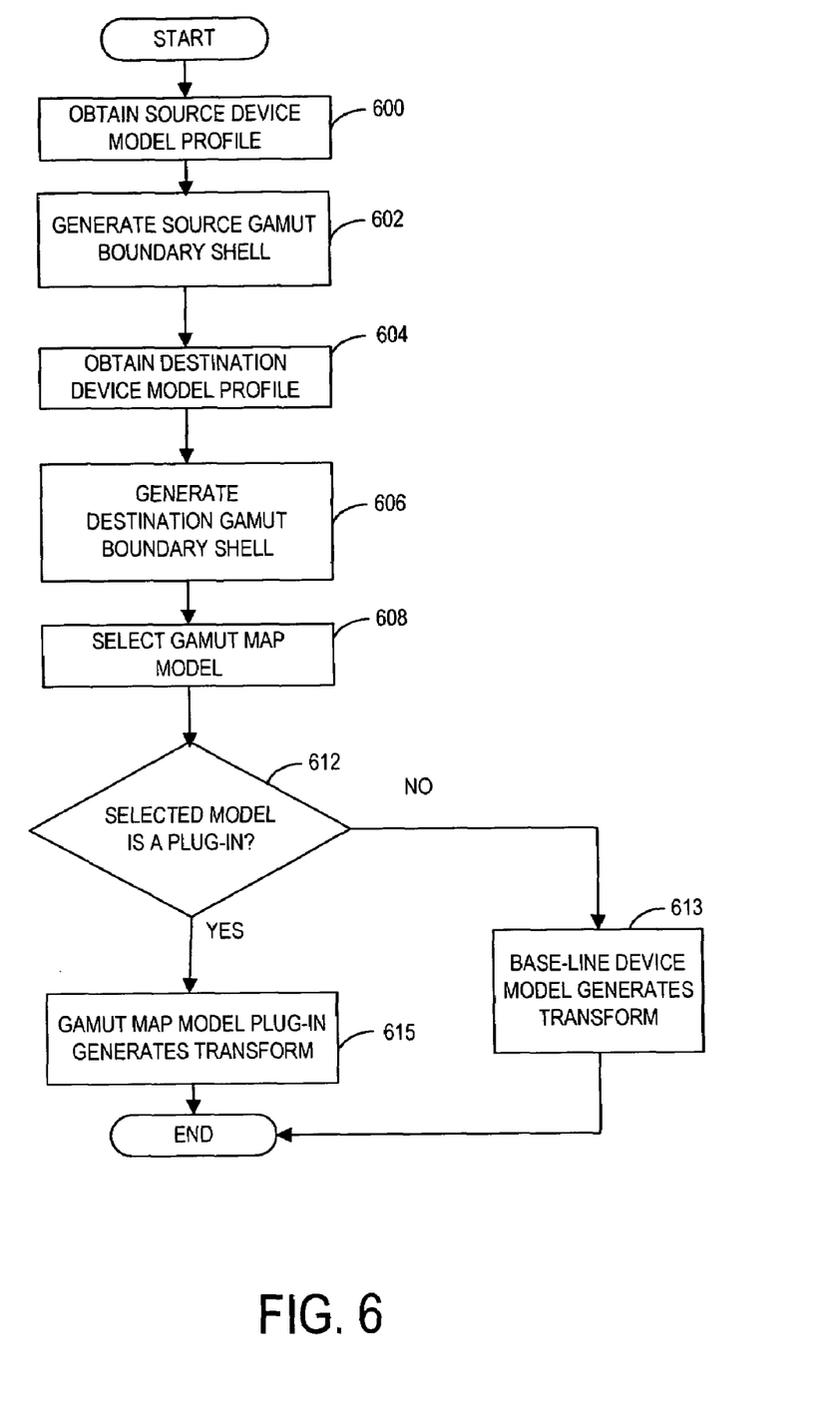
FIG. 6 is a flow chart illustrating a method for generating an image output, in accordance with an embodiment of the present invention.

FIG. 6 provides a flow chart of a method for displaying an image file according to another embodiment of the invention. The method begins with obtaining 600 a source device model profile. The source device model profile may optionally contain a reference to a device model plug-in, or a base-line device model may be used to generate 602 a source gamut boundary shell. A destination device model profile is also obtained 604. The destination device model profile obtained may also be a base-line source device model, or may be a plug-in source device model profile. The obtained destination device model profile is used to generate 606 a destination gamut boundary shell.

The method may continue with selection 608 of a gamut map model and gamut-map model profile. A gamut-map model can select an appropriate gamut map model profile based on the source and destination gamut boundary shells. The selected gamut map model profile may describe the relationship between the source gamut boundary shell and the destination boundary shell. In an embodiment, both the selected gamut map model and gamut map model profile can be plug-ins available for selection 612. Such plug-ins allow a third party to specify a desired model and/or data profile to suit a particular application.

The selected gamut map model and the source and destination gamut boundary shells are used to generate an transform, either using available plug-ins 615 or a baseline gamut map model 613. The transform provides algorithms for performing a transformation on an image by mapping each color contained in the source gamut boundary shell to a color contained in the destination gamut boundary shell. Because both the source gamut boundary shell and the destination gamut boundary shell are represented as triangular meshes, the transformation or "morphing" of colors with the source gamut boundary shell to colors within the destination gamut boundary shell can be described, for example, using techniques from the field of computer graphics.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A computer-implemented method for generating a transform performed on a computing device using a color engine, the computer-implemented method comprising:
   identifying a first device model plug-in to a first device model, the first device model plug-in comprising executable code provided as an extension to the color engine by a third party independent of a provider of the color engine;
   identifying a first device model profile plug-in to a first device model profile, the first device model profile plug-in comprising data referenced to the first device model;
   executing the first in device model plug-in over the data contained in the first device model profile plug-in via the computing device;
   executing a first color appearance model over data in a first color appearance model profile via the computing device;
   generating a first gamut boundary shell from execution of the first device model plug-in and the first color appearance model; and
   generating a transform based on the first gamut boundary shell via the computing device.

2. The computer-implemented method of claim 1, wherein the first gamut boundary shell is a source gamut boundary shell.

3. The computer-implemented method of claim 1, wherein the first color appearance model alters the first gamut boundary shell based on data contained in the first color appearance model profile.

4. The computer-implemented method of claim 1, further comprising:
   identifying a second device model plug-in to a second device model, the second device model plug-in comprising executable code provided as an extension to the color engine by a third party independent of the provider of the color engine;
   identifying a second device model profile plug-in to a second device model profile, the second device model profile plug-in comprising data referenced to the second device model;
   executing the second device model plug-in on the data from the second device model profile plug-in to generate a second gamut boundary shell via the computing device,
   wherein the transform is generated based on the first gamut boundary shell and the second gamut boundary shell.

5. The computer-implemented method of claim 4, wherein the second gamut boundary shell is a destination gamut boundary shell.

6. The computer-implemented method of claim 4, wherein a second color appearance model alters the second gamut boundary shell based on data contained in a second color appearance model profile.

7. The computer-implemented method of claim 4, wherein the first device model plug-in and the second device model plug-in are in direct communication.

8. The computer-implemented method of claim 1, wherein generating a transform comprises:
   providing a gamut map model plug-in; and
   using the gamut map model plug-in to generate a transform.

9. The computer-implemented method of claim 1, wherein generating a transform comprises:
   providing a gamut map model profile plug-in; and;
   generating the transform based on data stored in the gamut map model profile plug-in.

10. One or more computer-readable media storing instructions thereon, the instructions being executable to cause a computer to perform a method of generating a transform using a color engine, the method comprising:
    providing a first device model profile for a first device;
    identifying a reference to a first plug-in of a first device model in the first device model profile, wherein the first plug-in of the first device model comprises a third-party provided extension to the color engine;
    using the first-plug-in of the first device model to generate a first gamut boundary shell via the computer, wherein the first-plug-in of the first device model operates on data from a first plug-in of the first device model profile to generate the first gamut boundary shell;
    providing a second device model profile for a second device;
    identifying a reference to a second plug-in of a second device model in the second device model profile, wherein the second plug-in of the second device model comprises a third-party-provided extension to the color engine;
    using the second plug-in of the second device model to generate a second gamut boundary shell via the computer, wherein the second plug-in of the second device model operates on data from a plug-in of the second device model profile to generate the second gamut boundary shell; and
    generating a transform based on the first gamut boundary shell and the second gamut boundary shell via the computer.

11. The computer-readable media of claim 10, wherein the first gamut boundary shell is a source gamut boundary shell.

12. The computer-readable media of claim 10, wherein a first color appearance model alters the first gamut boundary shell based on data contained in a first color appearance model profile.

13. The computer-readable media of claim 10, wherein the second gamut boundary shell is a destination gamut boundary shell.

14. The computer-readable media of claim 10, wherein a second color appearance model alters the second gamut boundary shell based on data contained in a second color appearance model profile.

15. The computer-readable media of claim 10, wherein the first plug-in of the first device model and the second plug-in of the second device model are in direct communication.

16. The computer-readable media of claim 10, wherein generating a transform comprises:
   providing a gamut map model plug-in; and
   using the gamut map model plug-in to generate a transform.

17. The computer-readable media of claim 10, wherein generating a transform comprises:
   providing a gamut map model profile plug-in; and
   generating the transform based on data stored in the gamut map model profile plug-in.

18. One or more computer-readable media storing instructions thereon, the instructions being executable to cause a computer to perform a method for transforming image data using a color engine, the method comprising:
   providing a source device model profile for a source device, the source device model profile describing physical characteristics of the source device;
   determining via the computer whether the source device model profile references a first plug-in of a first device model provided as an extension to the color engine by a third party that is independent of a provider of the color engine;
   if the source device model profile references the first plug-in of the first device model, using the first plug-in of the first device model to generate a source gamut boundary shell based on data contained within the source device model profile, wherein the first plug-in of the first device model comprises executable code that operates over the data contained within the source device model profile to generate the source gamut boundary shell;
   if the source device model profile does not reference the first plug-in of the first device model, using a base-line device model provided as part of the color engine to generate the source gamut boundary shell based on the data contained within the source device model profile, wherein the base-line device model comprises executable code that operates over the data contained within the source device model profile to generate the source gamut boundary shell;
   providing a destination device model profile for a destination device, the destination device model profile describing physical characteristics of the destination device;
   determining via the computer whether the destination device model profile references a second plug-in of a second device model provided as an extension to the color engine by a third party that is independent of the provider of the color engine;
   if the destination device model profile references the second plug-in of the second device model, using the second plug-in of the second device model to generate a destination gamut boundary shell based on data contained within the destination device model profile, wherein the second plug-in of the second device model comprises executable code that operates over the data contained within the destination device model profile to generate the destination gamut boundary shell;
   if the destination device model profile does not reference the second plug-in of the second device model, using the base-line device model provided as part of the color engine to generate the destination gamut boundary shell based on the data contained within the destination device model profile, wherein the base-line device model comprises executable code that operates over the data contained within the destination device model profile to generate the destination gamut boundary shell;
   using a gamut map model plug-in of a gamut map model to generate a transform via the computer based on the source gamut boundary shell, the destination gamut boundary shell, and data stored in a gamut map model profile plug-in of a gamut map model profile, wherein the plug-in of the gamut map model comprises executable code that operates over the source gamut boundary shell, the destination gamut boundary shell, and the data stored in the plug-in of the gamut map model profile to generate the transform; and
   using the transform to convert the image data of an image file via the computer.

19. The computer-readable media of claim 18, wherein the gamut map model profile contains a number of gamut maps, and the gamut map model selects a gamut map based on the source gamut boundary shell and the destination gamut boundary shell.

* * * * *